United States Patent [19]
Engman et al.

[11] 3,984,134
[45] *Oct. 5, 1976

[54] CLAMP DEVICE

[75] Inventors: Milton C. Engman; Stanley J. Siberell, both of Des Moines, Iowa

[73] Assignee: Emco Industries, Inc., Des Moines, Iowa

[ * ] Notice: The portion of the term of this patent subsequent to Aug. 26, 1992, has been disclaimed.

[22] Filed: Aug. 13, 1975

[21] Appl. No.: 604,201

Related U.S. Application Data

[63] Continuation-in-part of Ser. No. 413,924, Nov. 8, 1973, Pat. No. 3,900,933.

[52] U.S. Cl. ............................... 285/382.2; 24/277
[51] Int. Cl.² ......................................... F16L 13/14
[58] Field of Search .................. 285/382.2; 24/277; 138/99

[56] References Cited
UNITED STATES PATENTS

| | | | |
|---|---|---|---|
| 2,993,255 | 7/1961 | Jagiel | 24/277 |
| 3,040,407 | 6/1962 | Brown | 24/277 |
| 3,900,933 | 8/1975 | Engman et al. | 24/277 |

*Primary Examiner*—Werner H. Schroeder
*Assistant Examiner*—Doris L. Troutman
*Attorney, Agent, or Firm*—Zarley, McKee, Thomte & Voorhees

[57] ABSTRACT

A clamp device for clamping first and second telescopically mounted tubes comprising a preformed bolt clamp and a saddle element. The preformed bolt clamp is of unitary and substantially rigid material and has a center portion and opposite end portions. The center portion extends completely around the outer surface of the outer tube with the end portions thereof extending outwardly from the outer tube in substantially the same direction. The saddle element generally comprises a center portion positioned between end portions which have openings formed therein to receive the end portions of the bolt clamp. The center portion of the saddle element is provided with an upwardly extending rib which not only strengthens the saddle element but also provides a contact point between the saddle and the helical bolt clamp. Fastening and tightening means comprising nuts are mounted on the end portions of the bolt clamp and are tightened to draw the saddle element into tight, intimate and continuous engagement with the adjacent part of the center portion of the bolt clamp, and to draw the center portion of the bolt clamp into tight, intimate and continuous engagement with the outer surface of the outer tube element. The saddle element has a configuration such that it is spaced from the outer surface of the portion of the outer tube element adjacent the center portion of the bolt clamp so that the saddle element bears against the adjacent part of the center portion of the bolt clamp. When the nuts are completely tightened, the end portions of the saddle element bear against the outer tube at approximately three o'clock and nine o'clock.

3 Claims, 8 Drawing Figures

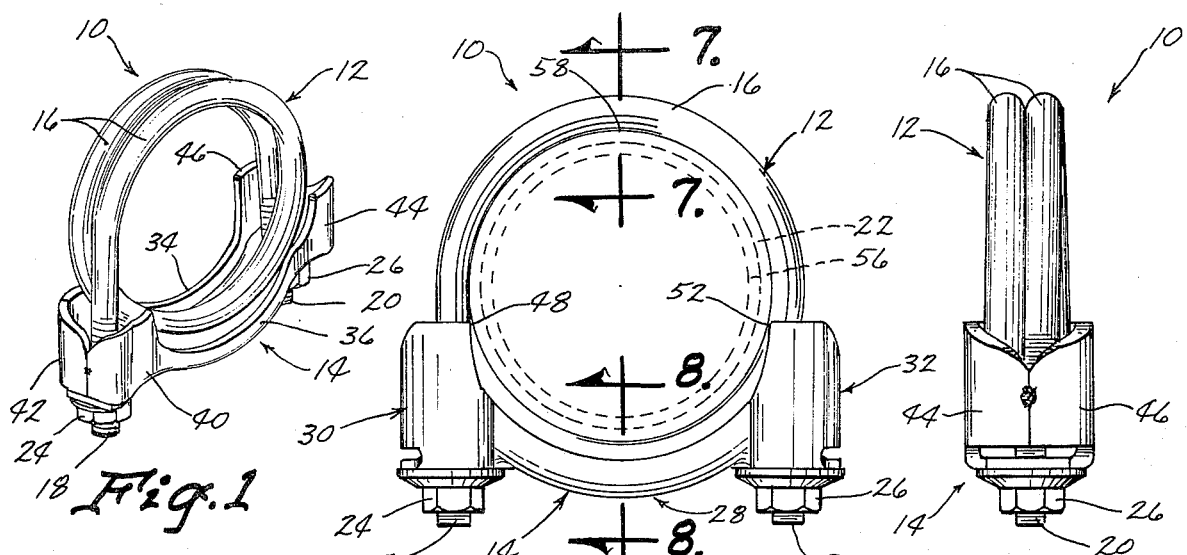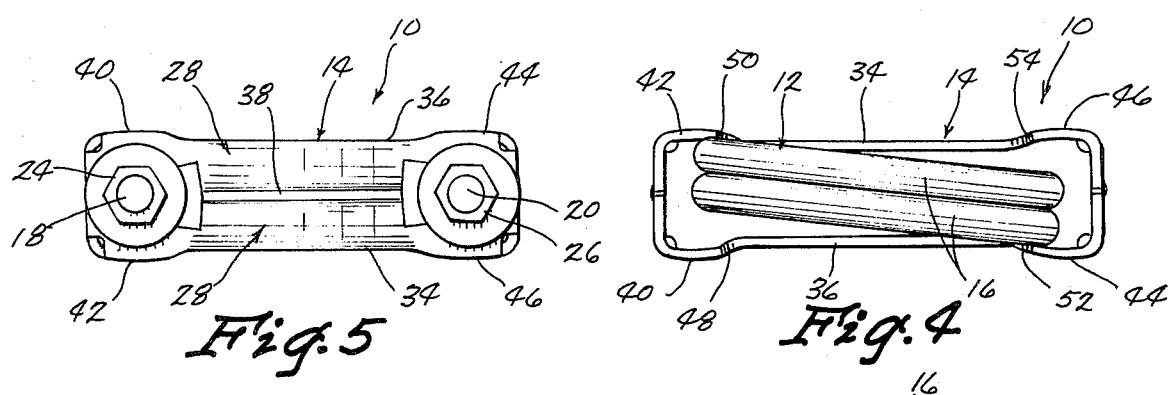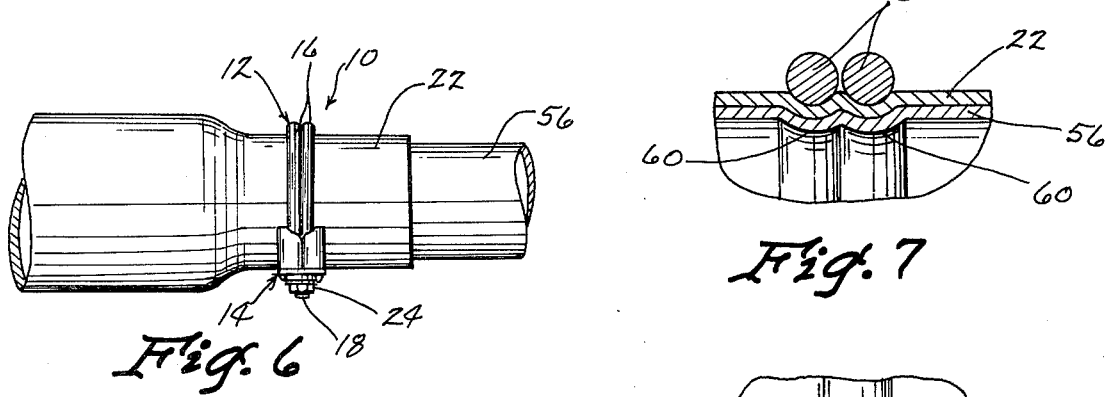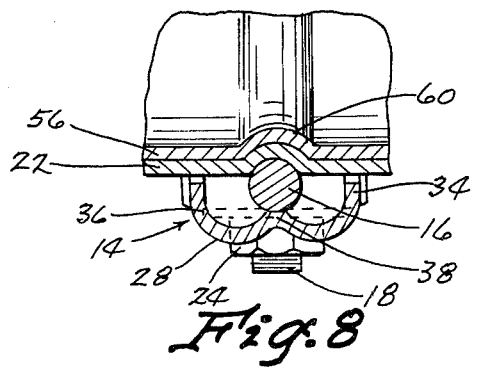

3,984,134

CLAMP DEVICE

BACKGROUND OF THE INVENTION

This is a continuation-in-part application of the application filed Nov. 8, 1973, Ser. No. 413,924 now U.S. Pat. No. 3,900,933

Conventional type pipe clamps generally comprise a U-shaped bolt and a saddle element having openings in its opposite ends for receiving the end portions of the U-shaped bolt. The saddle element is ordinarily U-shaped in cross-section so that the walls or legs of the saddle element bear against a portion of the pipe or tube. The conventional clamps do not uniformly compress the pipe around the circumference thereof but ordinarily exert greater pressure at the center of the bolt and the center of the saddle element. The conventional clamps do not create a uniform deformity in the pipe which results in some exhaust leakage occurring. The fact that exhaust leakage does occur greatly effects the atmosphere by polluting the same. This is especially true in the newer exhaust systems that include catalytic converters.

Applicants have previously devised an improved pipe clamp and such is disclosed in U.S. patent application Ser. No. 413,924 filed Nov. 3, 1973. The device of the earlier application represents a significant advance in the art and the instant invention is believed to represent a significant advance in applicants earlier device. It is believed that the instant invention is an advance over applicants earlier device in that deformation of the tubes can be accomplished with as little as 25 pounds of torque as compared to 35 – 40 pounds of torque required in the previous design.

Therefore, it is the principal object of the invention to provide an improved clamp device.

A further object of the invention is to provide a clamp device for clamping first and second telescopically mounted tubes.

A further object of the invention is to provide a clamp device which uniformly compresses the tubes around the circumference thereof.

A further object of the invention is to provide a clamp device comprising a preformed helical bolt which has a center portion extending completely around the outer surface of the tube element.

A further object of the invention is to provide a clamp device comprising a preformed bolt clamp and a saddle element with means provided on the saddle element for engagement with a part of a center portion of the bolt clamp.

A further object of the invention is to provide a clamp device wherein the saddle element exerts immediate pressure on the top center portion of the helical bolt as soon as the nuts on the bolt are started.

A still further object of the invention is to provide a clamp device which is economical to manufacture, durable in use and refined in appearance.

These and other objects will be apparent to those skilled in the art.

BRIEF DESCRIPTION OF THE DRAWINGS

This invention consists in the construction, arrangement and combination of the various parts of the device, whereby the objects contemplated are attained as hereinafter more fully set forth specifically pointed out in the claims and illustrated in the accompanying drawings in which:

FIG. 1 is a perspective view of the clamp device of this invention:

FIG. 2 is an end view of the clamp device:

FIG. 3 is a side view of the clamp device:

FIG. 4 is a top view of the clamp device:

FIG. 5 is a bottom view of the clamp device:

FIG. 6 is a side view of the clamp device used on a pair of telescopically mounted tubes:

FIG. 7 is a sectional view as seen on lines 7—7 and illustrating a portion of the telescopically mounted tubes: and FIG. 8 is a sectional view seen on lines 8—8 of FIG. 2 and illustrating a portion of the telescopically mounted tubes.

DESCRIPTION OF THE PREFERRED EMBODIMENT

The clamp device of this invention is referred to generally by the reference numeral 10 and generally comprises a preformed bolt clamp 12 and a saddle element 14. Bolt clamp 12 is of general helical form and is comprised of unitary and substantially rigid material, the specifications of which will be described hereinafter. Bolt clamp 12 generally comprises a center portion 16 and opposite end portions 18 and 20. As seen in the drawings, the center portion 16 extends completely around the outer surface of the outer tube element referred to generally by the reference numeral 22. The end portions 18 and 20 extend outwardly from the outer tube element in substantially the same direction. As seen in FIG. 1, end portions 18 and 20 are provided with externally threaded portions for receiving the flanged nuts 24 and 26 respectively.

Saddle element 14 generally comprises a center portion 28 and end portions 30 and 32. Center portion 28 is provided with upstanding flanges 34 and 36 at the opposite sides thereof as best seen in FIGS. 1 and 4. An upstanding rib 38 (FIG. 8) is formed in center portion 28 by stamping or the like and is provided to strengthen the saddle element 14 and to provide a contact point between the saddle element and the helical bolt 16.

End portion 30 of saddle element 14 is generally comprised of side members 40 and 42 which are deformed in the manner as illustrated in FIG. 1 and preferably spot welded together. Likewise, end portion 32 of saddle element 14 generally comprises side members 44 and 46. For purposes of description, side members 40 and 42 will be described as including upper inner end portions 48 and 50 respectively while side portions 44 and 46 will be described as including upper inner end portions 52 and 54 respectively. End portions 30 and 32 are provided with openings formed therein adapted to receive the end portions 18 and 20 of the bolt 16.

The clamp device is used as follows. Prior to the tube 56 being telescopically received within the tube 22, the bolt clamp 12 is slipped over the open end of the tube 22. The tube 56 is then slidably extended into the tube 22 such as seen in FIG. 6. Saddle element is then mounted on the bolt clamp. Nuts 24 and 26 are then threadably mounted on the end portions 18 and 20 of the bolt clamp and are tightened. As soon as the nuts 24 and 26 are started, the saddle exerts immediate pressure on the top center portion 58 of the helical bolt. The net result of this is that deformation of the tubes can be accomplished with as little as 25 pounds of torque. Continued tightening of the nuts 24 and 26 causes the center portion of the bolt clamp to be drawn into tight, intimate and continuous engagement with the outer surface of the tube element 22 and causes the rib 28 to bear against the bolt clamp. The tightening of the bolts 24 and 26 causes the center portion of the bolt clamp to uniformly compress the telescopically mounted tubes around the entire circumference thereof so that the tubes are uniformly deformed such as seen in FIGS. 7 and 8 and generally referred to by the reference numeral 60. The deformation 60 positively prevents exhaust leakage between the telescopically mounted tubes. It is extremely important to note that the clamp device creates a deformity of the pipes in a 360° arc so that the pipes are not deformed into an oval shape such as occurs with conventional clamps. When the device is completely tightened, the portions 48 and 50 touch the outer tube at approximately nine o'clock with the portions 52 and 54 touching the outer tube at approximately three o'clock.

The specifications for the bolt 12 are preferably that it be comprised of 1038 steel having a tensel strength of 100,000 P.S.I. to 120,000 P.S.I. Preferably, the bolt has a ⅜ inch diameter. The saddle element 14 is preferably comprised of hot or cold 11 gauge steel. Thus it can be seen that the bolt clamp accomplishes at least all of its stated objectives.

We claim:

1. The combination of a clamp device and two telescopically mounted tube elements comprising, a first tube element having at least one open end, a second tube element telescopically mounted in close fitting relationship within the open end of said first tube element, a preformed bolt clamp of unitary and substantially rigid material having a center portion and opposite end portions, said center portion extending completely around the outer surface of said first tube element with said end portions extending outwardly from said first tube element in substantially the same direction, the outer surface of said first tube element having a portion adjacent the center portion of said bolt clamp, a saddle element embracing a part of the center portion of said bolt clamp and having openings therein to receive the end portons of said bolt clamp, said saddle element being of stiff and rigid material, fastening and tightening means on the end portions of said bolt clamp and being tightened to draw said saddle element into tight, intimate and continuous engagement with the adjacent part of the center portion of said bolt clamp, and to draw the center portion of said bolt clamp into tight, intimate and continuous engagement with the outer surface of said first tube element, said saddle element having a configuration such that it is spaced from the outer surface of the portion of said first tube element adjacent the center portion of said bolt clamp so that said saddle element bears against the said adjacent part of a center portion of said bolt clamp.

2. The combination of claim 1 wherein said saddle element has a rib projecting therefrom which strengthens said saddle element and which provides a point of contact between said saddle element and said bolt clamp.

3. The combination of claim 1 wherein said saddle element includes end portions which engage the outer tube at two opposite positions approximately 90° from the point of contact between said saddle element and the center portion of said bolt clamp.

* * * * *